T. ROGERS.
Harrow.

No. 214,955. Patented April 29, 1879.

Witnesses.
Bartram Zevely
R. K. Evans.

Inventor.
Timothy Rogers
by A. H. Evans & Co.
Attys

T. ROGERS.
Harrow.
No. 214,955. Patented April 29, 1879.
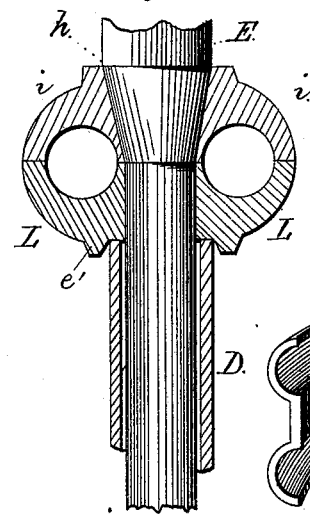
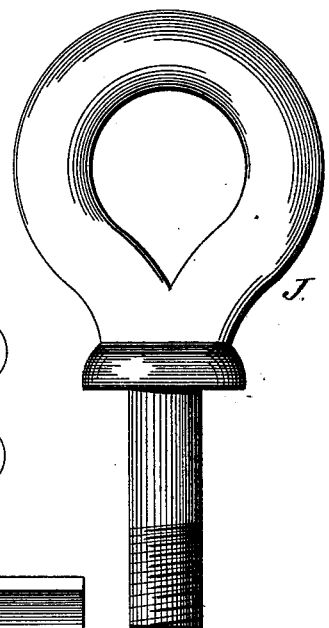
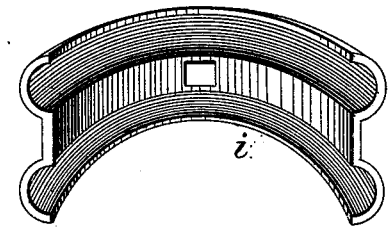
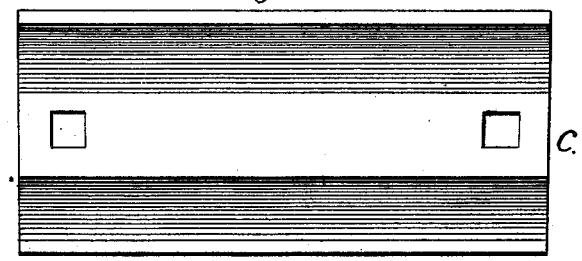
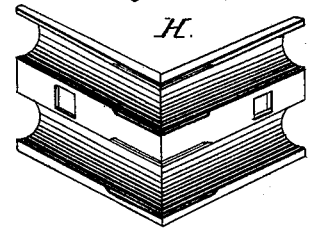
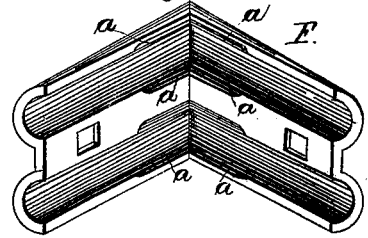
Witnesses.
Bartram Zevely
R. N. Evans
Inventor.
Timothy Rogers
by A. H. Evans & Co.
Attys

UNITED STATES PATENT OFFICE.

TIMOTHY ROGERS, OF MOUNT VERNON, OHIO, ASSIGNOR OF ONE-HALF HIS RIGHT TO BENJ. A. F. GREER, OF SAME PLACE.

IMPROVEMENT IN HARROWS.

Specification forming part of Letters Patent No. 214,955, dated April 29, 1879; application filed September 23, 1878.

*To all whom it may concern:*

Be it known that I, TIMOTHY ROGERS, of Mount Vernon, in the county of Knox and State of Ohio, have invented a new and valuable Improvement in Iron Harrows; and I do hereby declare that the following is a full, clear, and exact description of the same, reference being had to the accompanying drawings, making a part of this specification, in which—

Figure 1:
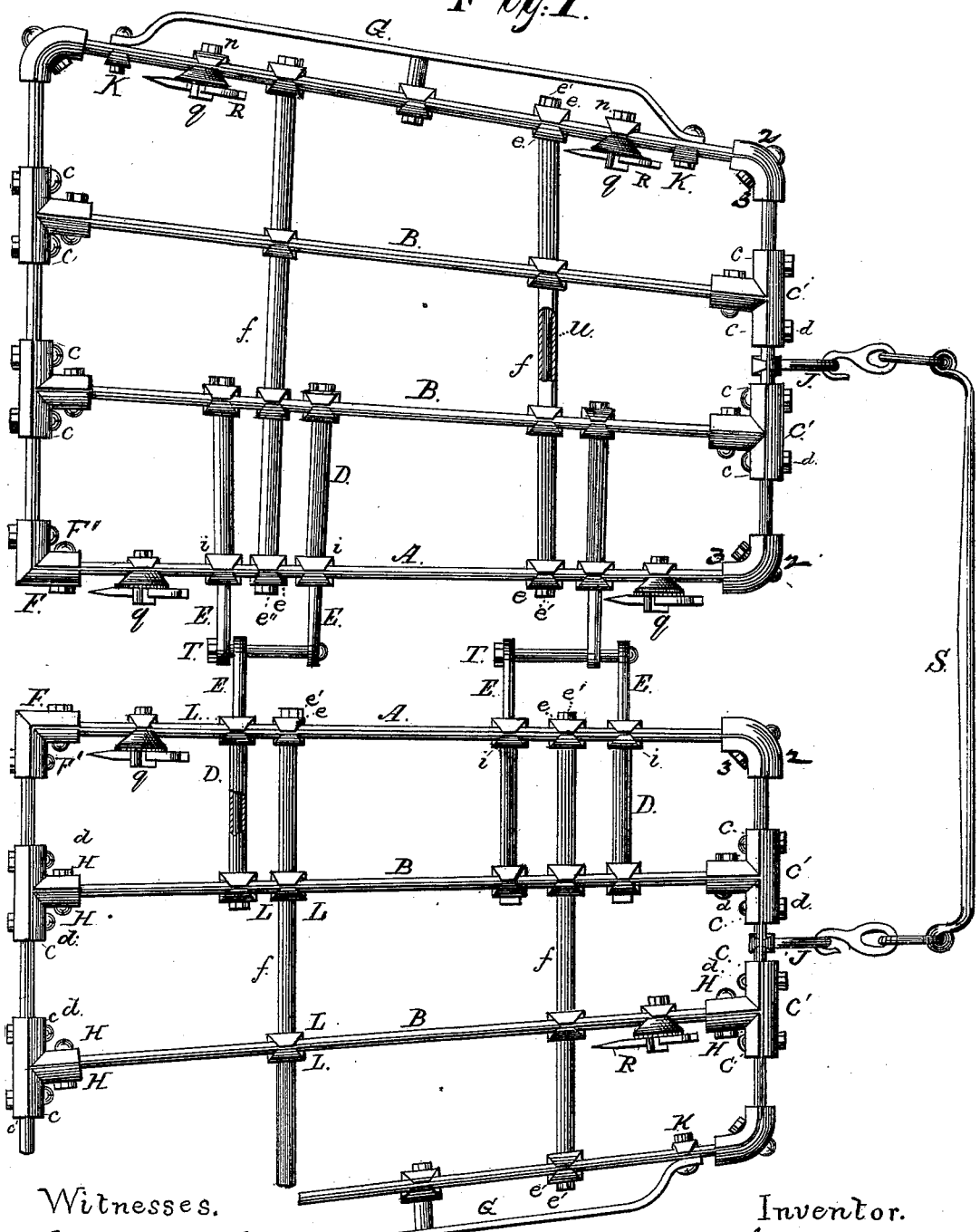

Figure 1 is a plan view of my harrow. Figs. 2 to 13 are details to be referred to.

This invention has relation to iron-framed harrows; and consists in the novel mode in which the frame is constructed and held together, as hereinafter more fully described.

In order that those skilled in the art may make and use my invention, I will proceed to describe the manner in which I have carried it out.

Figure 6:
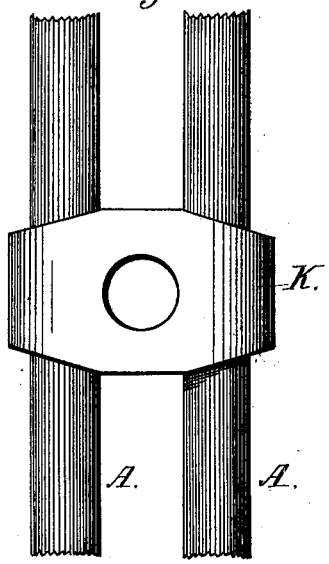
Figure 7:
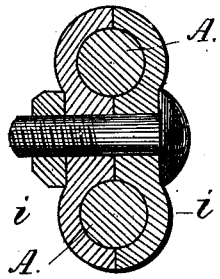

In the said drawings, A A designate rods forming the frame of my harrow, which is shown in side elevation and enlarged in Fig. 6. The frame is formed of duplex bars, and the outside frame of each of the sections of the harrow I form out of continuous parallel bars bent in proper outline, starting them from the square corner at F, Fig. 1, and passing entirely around the frame, and having the outer corners bent in curves. Each corner is secured and straightened and the bars kept parallel by means of grooved clamps conforming in shape to the corners, and secured by means of bolts passing through said clamp and between the frame-rods A A. When the ends of bars A come together at square corners they are struck up or somewhat enlarged, and these enlargements fit into recesses *a a* in the grooves of the rectangular clamps F and H. (Shown in Figs. 2 and 3.) This secures the loose ends in a solid and permanent manner without welding the rods.

The intermediate longitudinal bars E E, Fig. 1, are formed of two parallel rods lying in the same planes with outside bars, and they are secured at their ends to the outside-frame rods by means of two rectangular clamps, *c c*, and a straight clamp, *c'*, secured by bolts *d d*. The entire frame now is strengthened and secured transversely by means of two or more rods, *u u*, passing entirely through the frame and between the rods of the frame, and held against the outer frame by clamps *e e* and nuts *e'*. Surrounding the rods *u*, and between each of the pairs of the longitudinal bars, is a sleeve, *f*, having bearings for its ends in grooved clamps *e'' e'''*. These serve as braces and keep the longitudinal bars always equidistant. The two sections of the harrow are hinged together by means of the hinges E E E, Fig. 1, of which there are two arms on one side and one on the other. These hinges have a bolt, T, passing through the eyes of the same. The hinges on the rear end of the harrow are in a reverse position from the front end. This allows one section of the harrow to drop back of the other when in motion, as the draft of the harrow is always from one or the other of the corners of the draft-bar S, Fig. 1.

It is evident that the course of the harrow is in a diagonal line, and one section dropping back still helps to bring the whole frame in a diagonal position. The hinges are secured to the frame by means of each hinge having a long shank, this shank passing through the first pair of bars of the frame, and extending back through the second bar of the frame and a sleeve over the shank, and secured between the first and second bars by means of the clamps L. The hinge-bars are provided with shoulders *h*, Fig. 8, which fit into recesses in grooved clamps *i i*. This prevents the hinge from twisting from its right position. The hinge-bars have an upward bend after leaving the clamps. This bend is so arranged, as shown, that one section of the harrow can be turned over on top of the other, and lie down flat without the upper ends of the teeth interlocking. The outside of the frame is provided with a fender or curved guard, as shown at G. This guard has a double purpose. It serves as a guard or fender to the nuts and clamps holding the teeth in the outer bar of the frame in passing around articles, such as stumps, stones, &c., and also acts as a runner, by which means the harrow can be transported along the road or from one field to another without dragging it on the teeth or necessitating loading it on some vehicle for transportation. The harrow, when it is to be transported, is turned with the sections back to back, then set up on the guards or runners. The harrow is held in this position by means of a rod of iron. (Not shown in the drawings.) This allows of an easy way to move the harrow from one point to another without doing damage to the same. These guards are secured to the frame by means of bolts or clamps K at their ends, and the center of the same can be secured by bolts and short sleeves; or the long bolts V V can continue on through the guard.

Figure 2:
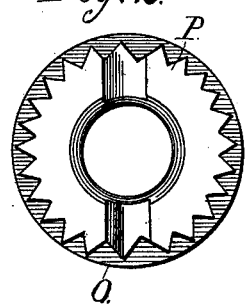
Figure 4:
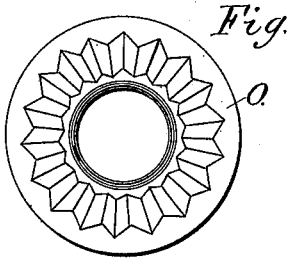
Figure 5:
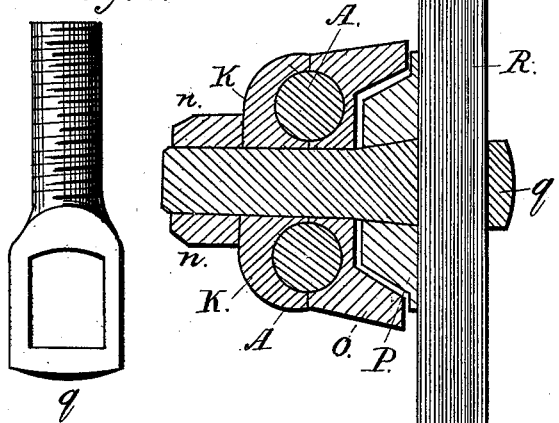
Figure 3:

The draft-bar S is attached to the frame by means of the cockeyes I I. The teeth are attached to the frame in the following manner, to wit: Each tooth is provided with a loop-bolt, q, Fig. 5. This bolt is provided with a hole through one end for the tooth to slip through easy. Each tooth then is provided with a ratchet-thimble (shown in Fig. 2) and a ratchet-cup, Fig. 4. The cup O, Fig. 4, is made on the rear side to conform to the frame-rods, and on the front it is provided with a recess or cup, of which the inside is made in a circular ratchet, and the thimble F, Fig. 2, is made with the ratchets on the outside. These ratchets are made to fit neatly into each other. Each pair of ratchets is provided with a clamp, as shown at K, Fig. 3. The ratchets O and P are placed in position on the frame-rods, and the tooth inserted through the loop-bolt q, and this bolt passed through the opening through the ratchets and between the duplex rail of the frame and through the clamp K, and is then secured by means of the nut n. The face of the thimble-ratchet P, Fig. 3, is provided with a groove or recess across the face of the same large enough for the reception of the tooth. This holds the tooth in the position which it is placed in, and prevents it from slipping. This allows the tooth to be placed in a perfectly-upright position; or it can be placed in any angle backward that may be desired. This is a great advantage over common harrows, as it allows the harrow in a few minutes to be converted from a straight-tooth to an angle or smoothing harrow, and can be readily converted to any shape to suit the desired work to be performed.

I do not confine myself to any number of teeth, as it is apparent that as many teeth can be attached as is necessary, and when a tooth becomes dull on one side it can be instantly changed by loosening nut n and slipping out the tooth and turning a sharp corner to the work. By this arrangement of fastening I can slip the teeth along the frame-rods and place them close together or separate them, at will.

Having thus described my invention, I claim as new and desire to secure by Letters Patent—

1. The harrow-frame composed of a single bar, A, bent as shown, and having its ends clamped between clamp-plates F F' and the corners strengthened by plates 2 3, substantially as set forth.

2. The intermediate bars, B, in combination with the clamping-plates C C' and frame-bar A, substantially as described.

TIMOTHY ROGERS.

Witnesses:
 ALEX. B. INGRAM,
 ELI C. McCLOY.